(12) United States Patent
Watkins

(10) Patent No.: US 6,558,028 B1
(45) Date of Patent: May 6, 2003

(54) PROJECTOR AND ILLUMINATION DEVICE CEILING MOUNT

(75) Inventor: D. Scott Watkins, Roswell, GA (US)

(73) Assignee: GRP, Inc., Birmingham, MI (US)

( * ) Notice: Subject to any disclaimer, the term of this patent is extended or adjusted under 35 U.S.C. 154(b) by 0 days.

(21) Appl. No.: 09/638,408

(22) Filed: Aug. 11, 2000

(51) Int. Cl.[7] ................................................ B60Q 1/26
(52) U.S. Cl. ........................ 362/490; 362/479; 362/504; 359/13
(58) Field of Search ................................ 362/479, 488, 362/490, 503, 504, 471; 359/13; 250/334

(56) References Cited

U.S. PATENT DOCUMENTS 4,178,701 A  * 12/1979  Sadler ........................ 434/286
5,056,890 A  * 10/1991  Iino et al. .................... 248/487
5,519,410 A     5/1996  Smalanskas et al.
5,582,474 A  * 12/1996  Van Order et al. ......... 362/105
5,729,016 A  *  3/1998  Klapper et al. ............. 250/334

FOREIGN PATENT DOCUMENTS

DE     37 03 847 A1    8/1988
EP     0 899 157 A1    3/1999

* cited by examiner

Primary Examiner—Sandra O'Shea
Assistant Examiner—Guiyoung Lee
(74) Attorney, Agent, or Firm—Foley & Lardner

(57) ABSTRACT

A projector mounting system for use in a vehicle including a mounting housing that is capable of being attached to the ceiling of a vehicle, an illumination device that is connected to the mounting housing, and a projector that is mounted to the mounting housing.

17 Claims, 2 Drawing Sheets

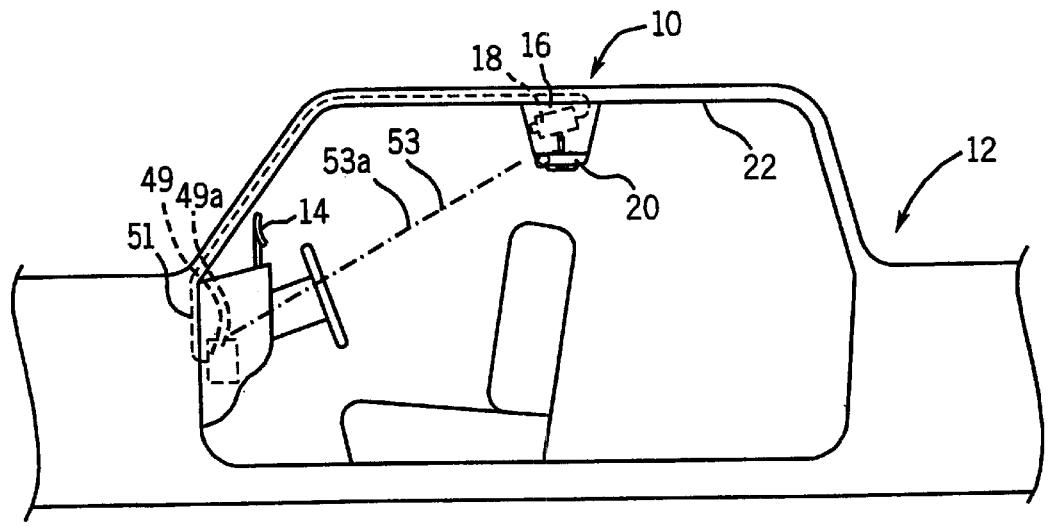
FIG. 1
FIG. 3
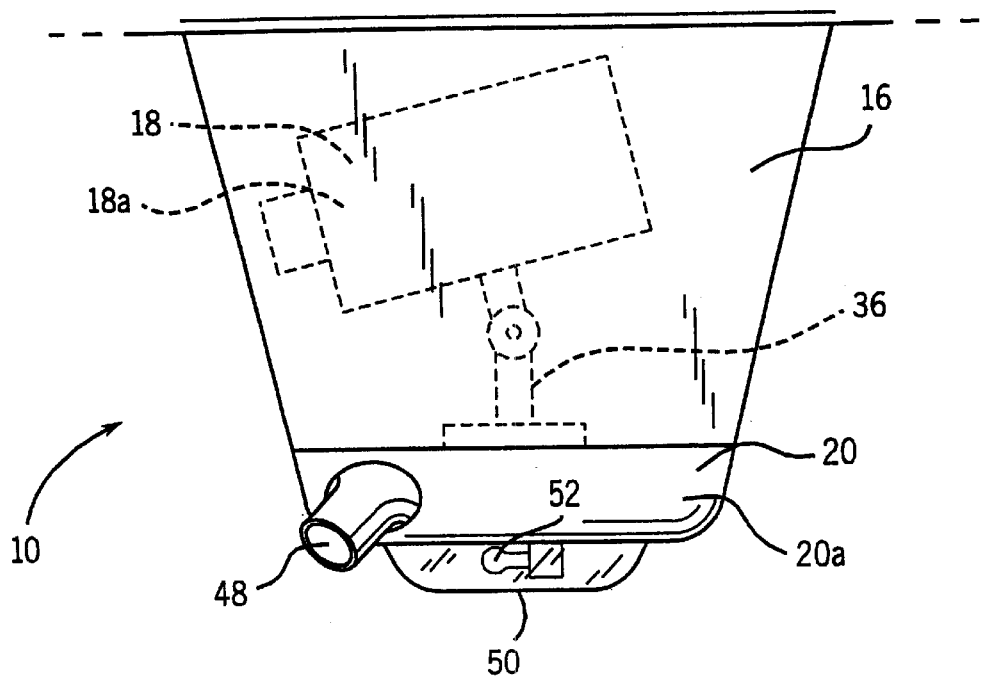

PROJECTOR AND ILLUMINATION DEVICE CEILING MOUNT

FIELD OF THE INVENTION

The present invention relates to an apparatus for mounting image projecting devices in motor vehicles. More particularly, the present invention relates to an apparatus for mounting image projecting devices in combination with an illumination device to the ceilings of motor vehicles.

BACKGROUND OF THE INVENTION

Systems for projecting images onto a reflective surface, which then reflects the images to an observer who sees a virtual image overlapped with outside scenery viewed through a windshield are well known within the art. These systems are commonly referred to as heads-up display systems, and generally include at least one projector and a reflector. The projector receives a signal from some type of source, whether it be a video recording device, a device for measuring the speed of a vehicle, or numerous other possible devices, and transforms the signal into beams of light that it projects onto the reflector. The reflector, sometimes referred to as a combiner, then receives these the light beams and reflects them to an observer.

When the heads up display system is used in motor vehicles, the reflectors are normally located in front of the driver and positioned so that no obstructions block the reflected light beams as they travel from the reflector to the driver. The projectors can be located in various places within the motor vehicle, and do not necessarily have to project the light beams directly onto the reflector. One common place to locate a projector is in the dashboard. However, due to space concerns, positioning the projector so that it projects its light beams directly onto the reflector is not always feasible. In these situations, mirrors are used to direct the light beams to the reflector. The ceiling of the motor vehicle is another known place to mount a projector. This is often advantageous because it does not require positioning the projector in an already crowded dashboard and it allows the light beams to be projected directly onto the reflector.

Although mounting a projector to the ceiling of a motor vehicle has its advantages, it also creates a potential problem. In most vehicles, devices such as dome lights, maps lights, temperature control panels, direction sensing and displaying apparatuses, information displays, keyless entry signal receivers, and even video monitors are mounted to the ceilings of the vehicles. Often times, the placement of these devices on the ceiling conflicts with the desired placement of the projector. In such situations, the current practice is to either place the projector in a different, less than optimum location, or move the conflicting device to a different location, if it is not completely removed. Accordingly, only one device, including the projector, can occupy the desired position on the ceiling. Thus, there is a continuing need for an apparatus that allows the projector and at least one additional accessory to be mounted together, or to share the same position on the ceiling.

BRIEF SUMMARY OF THE INVENTION

The present invention is directed to a projector mounting system for use in a vehicle including a mounting housing that is capable of being attached to the ceiling of a vehicle, an illumination device that is connected to the mounting housing, and a projector that is mounted to the mounting housing.

The present invention is also directed to a mounting housing that is used for the attachment of a projector and an illumination device to the ceiling of a vehicle. The mounting housing includes a ceiling mount configured for the attachment of the mounting housing to the ceiling of the vehicle, an illumination device mount configured for the attachment of the illumination device to the mounting housing, and a projector mount for securing the projector to the mounting housing.

The present invention is also directed to a projector mounting system for use in a vehicle having at least one mounting housing that can be attached to the ceiling of a vehicle, at least one accessory that is connected to the mounting housing, and at least one projector that is mounted to the mounting housing.

BRIEF DESCRIPTION OF THE DRAWINGS

FIG. 1 is a side elevational view of the projector mounting system shown mounted to the ceiling of a motor vehicle.

FIG. 3 is a side elevational view of the projector mounting system supporting two different illumination devices.

DETAILED DESCRIPTION OF THE PREFERRED EMBODIMENTS

Figure 2:
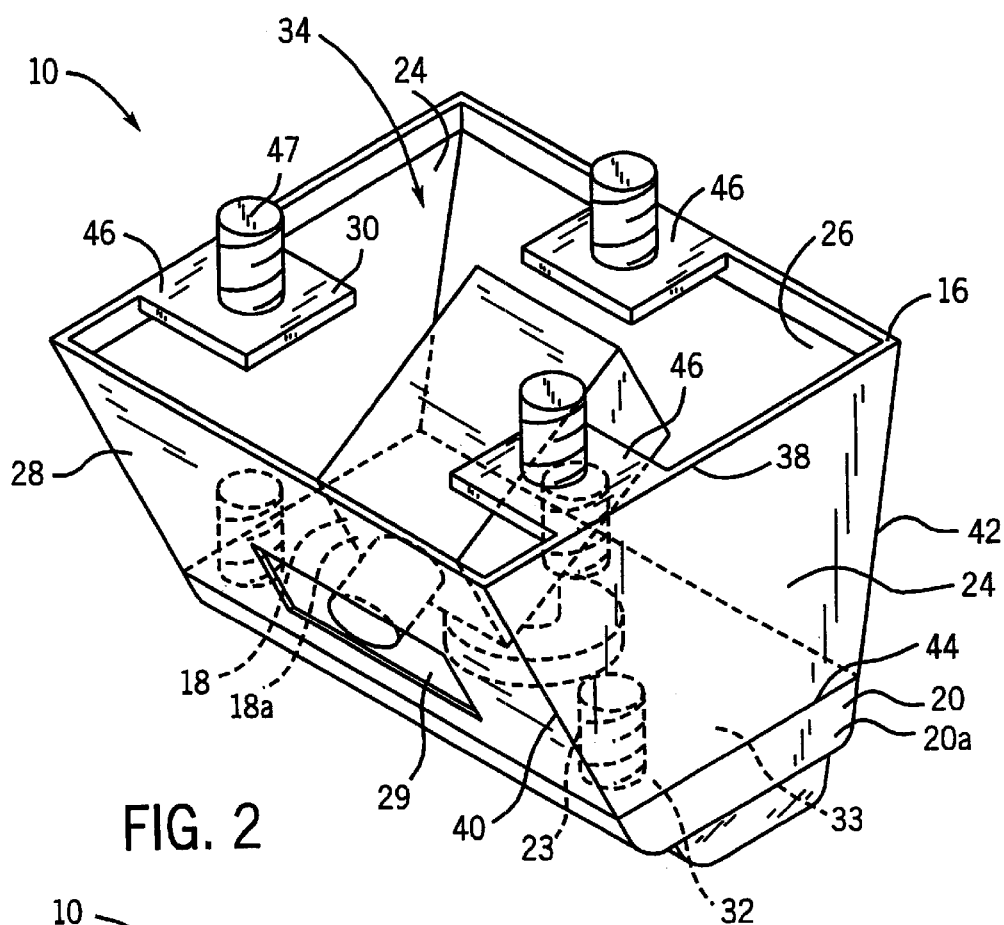
FIG. 2 is a perspective view of the projector mounting system shown in FIG. 1.

FIG. 1 illustrates a projector mounting system 10 as it is positioned in a motor vehicle 12 with respect to a combiner 14. Projector mounting system 10 includes a mounting housing 16, a light projecting device 18, and an illumination device 20. Mounting housing 16 is a housing, made preferably out of metal or a rigid polymer, that attaches to ceiling 22 and that supports light projecting device 18, and illumination device 20. The mounting housing 16 can be one continuous piece of material, or it can be made up of several sections, with manufacturing and structural considerations dictating the number and shape of the sections. There is no particular shape that mounting housing 16 must take.

In the preferred embodiment, shown in FIG. 2, mounting housing 16 includes two side walls 24, a back wall 26, a front wall 28, a ceiling mount 30, an illumination device mount 32, a volume 34, and a light projecting device mount 36. Side walls 24 are rigid upstanding panels that are oriented substantially parallel to the longitudinal axis of motor vehicle 12. In the preferred embodiment, side walls 24 are spaced apart and parallel. However, in other embodiments, side walls 24 may angle toward or away from each other with respect to the front and rear of each side wall and with respect to the top and bottom of each side wall. Each side wall 24 is trapezoidal in shape and includes an upper edge 38, a front side edge 40, a rear side edge 42, and a lower edge 44. Upper edge 38 is the highest edge of each side wall 24, and is substantially horizontally oriented. In the preferred embodiment, upper edge 38 makes up the longer of the two parallel sides of the trapezoid. When mounting housing 16 is attached to motor vehicle 12, upper edge 38 is adjacent and substantially parallel to ceiling 22. Front side edge 40 and rear side edge 42 of each side wall 24 form the two non-parallel sides of the trapezoid. As such, side edges 40 and 42 extend between upper edge 38 and lower edge 44, with front side edge 40 being the edge that is closest to the front of motor vehicle 12 and rear side edge 42 being the edge that is closest to the rear of motor vehicle 12. Lower edge 44 is the lowest edge of each side wall 24, and in the preferred embodiment makes up the shorter of the two parallel sides of the trapezoid. As a result of this configuration, front side edge 40 angles toward the rear of motor vehicle 12, with the highest end of front side edge 40 being closer to the front of motor vehicle 12 than the lowest end. Rear side edge 42 angles toward the front of motor vehicle 12, with the highest end of rear side edge 42 being closer to the rear of motor vehicle 12 than the lowest end.

Back wall 26 extends between and connects to side walls 24 on their respective rear side edges 42. In this configuration, back wall 26 is perpendicular to both side walls 24 and to the longitudinal axis of motor vehicle 12. Due to the angle of the rear side edges 42 of side walls 24, the top of back wall 26 is closer to the rear of motor vehicle 12 than the bottom.

Front wall 28 extends between and connects to side walls 24 on their respective front side edges 40. Like back wall 26, front wall 28 is perpendicular to both side walls 24 and to the longitudinal axis of motor vehicle 12. The angle of front side edges 40 causes front wall 28 to be angled such that the top of front wall 28 is closer to the front of motor vehicle 12 than the bottom. In the preferred embodiment, front wall 28 is made of a rigid transparent material that allows light to travel through. In an alternative embodiment, front wall 28 includes an aperture 29 through which light passes. The aperture may be of any shape, and may be as large or small as desired within the size constraints of front wall 28.

Ceiling mount 30 attaches mounting housing 16 to ceiling 22 of motor vehicle 12. In one embodiment, ceiling mount 30 includes mounting tabs 46 that are attached to the uppermost edges of side walls 24, back wall 26, and front wall 28. Each mounting tab 46 is substantially perpendicular to the wall to which it is attached and extends into the area enclosed by the connection of side walls 24, front wall 28, and back wall 26. In one variation, the mounting tabs are extensions of the walls that are merely bent over into the area enclosed by the four walls. In another variation, mounting tabs 46 are attached to the walls by an attachment means, such as a fastener, weld, or the like, such that they extend into the enclosed area. In either case, the upper surface of each mounting tab 46 lies in substantially the same plane as the top edge of mounting housing 16, which includes the top edge of side walls 24, back wall 26, and front wall 28. Each mounting tab 46 includes a hole through which a fastener, such as a bolt 47, rivet, or screw, can pass. Ceiling 22 includes corresponding holes such that a fastener, shown as bolt 47 in FIG. 2, can pass from below through each mounting tab 46 to engage a portion of ceiling 22 or a device for receiving the fastener that is positioned on the other side of ceiling 22. In an alternative embodiment, a top panel is substituted for mounting tabs 46. The top panel extends over the area enclosed by the uppermost edges of side walls 24, back wall 26, and front wall 28, and is attached to at least one of the walls. The top panel includes holes through which fasteners passing from below engage portions of ceiling 22 or devices for receiving the fasteners that are positioned on the other side of ceiling 22. In another alternative embodiment, magnets having attracting poles are securely mounting to ceiling 22 and to mounting housing 16 such that the magnets secured to ceiling 22 attract the magnets attached to mounting housing 16, and thereby secure mounting housing 16 to ceiling 22. Yet another alternative embodiment of ceiling mount 30 is described below with respect to illumination device mount 32. There are a myriad of other possible variations and embodiments of ceiling mount 30 that are well known in the art. The variations and embodiments described above are only examples and are not intended to limit the possible variations and embodiments.

Illumination device mount 32 provides the means for attaching illumination device 20 to mounting housing 16. In the preferred embodiment, the illumination device 20 that is attached to mounting housing 16 is a pre-existing dome light 20a that was mounted to ceiling 22 of motor vehicle 12 before the installation of projector mounting system 10. Therefore, in a preferred embodiment, mounting housing 16 includes a bottom panel 33 to which pre-existing dome light 20a attaches that simulates ceiling 22 to which the dome light 20a was originally attached. Simulation of ceiling 22 by bottom panel 33 allows dome light 20a to be attached to mounting housing 16 in the same way it was attached to ceiling 22, such as by bolts 23 shown in FIG. 2. Similarly, in a preferred embodiment, ceiling mount 30 includes the same means and setup of attaching mounting housing 16 to ceiling 22 as is included in pre-existing dome light 20a. This allows mounting housing 16 to be attached to ceiling 22 without making any modification to ceiling 22 or mounting housing 16. Other alternative embodiments are well known in the art and therefore do not require a description.

In a preferred embodiment, mounting housing 16 includes volume 34, which is defined by the volume created between side walls 24, back wall 26, front wall 28, bottom panel 33, and a top panel or ceiling 22. Volume 34 allows light projecting device 18 to fit within mounting housing 16 such that light projecting device 18 is at least partially enclosed by mounting housing 16. However, in alternative embodiments of mounting housing 16, volume 34 is absent. Volume 34 is absent in mounting housing 16, for example, in an alternative embodiment wherein mounting housing 16 is made up of a top panel, a side panel perpendicular to top panel, and a bottom panel perpendicular to the side panel and parallel to the top panel. In this embodiment, the three panels do not define a volume 34. Nevertheless, in some embodiments of mounting housing 16, volume 34 is necessary for mounting light projecting device 18 within mounting housing 16.

As shown in FIG. 3, light projecting device mount 36 attaches a light projecting device 18 to mounting housing 16. In a preferred embodiment, light projecting device mount 36 includes a means for rotating light projecting device 18 around two perpendicular axes, such as around the vertical and horizontal axes, with respect to mounting housing 16. In alternative embodiments, light projecting device mount 36 includes only the means for rotating light projecting device 18 around one of the two perpendicular axes with respect to mounting housing 16. In these embodiments, rotation around the second axis may be provided by the connection of mounting housing 16 to ceiling 22, which may include a means of rotating mounting housing 16 around the second axis with respect to ceiling 22, or rotation around the second axis may not be provided at all. In other alternative embodiments, light projecting device mount 36 may not include a means for rotating light projecting device 18 with respect to mounting housing 16. In these embodiments, the means for rotation may be included in other components, such as the connection between ceiling mount 30 and ceiling 22, or it may not be provided at all. The means for rotating light projecting devices are well known within the art and therefore require little discussion. Generally, the means for rotating a component usually includes a pin that is co-axial to the desired axis of rotation and a pin support member such that the pin rotates relative to the support member, and vice versa. The object that is desired to be rotated is then attached to the pin, while the pin support member is attached to a mounting surface with respect to which rotation is desired.

Light projecting device 18, shown in FIG. 2 as a projector 18a, is another element included in projector mounting system 10. Light projecting devices are well known to those skilled in the art. There are a variety of different light projecting devices for a variety of different purposes. In a preferred embodiment, light projecting device 18 is a projector 18a, or what is also referred to in the art as a display unit, that receives signals from a signal generating source 49, translates the signals into an image, and projects the image onto a reflecting surface. A combiner 14, disclosed in U.S. Pat. No. 5,519,410, is used as the reflecting surface. Together, these elements form a heads-up display. A heads-up display is a display system in which an image is projected from projector 18a onto a reflecting device (shown as combiner 14), which then reflects the image to an observer who sees a virtual image overlapped with outside scenery viewed through windshield 15. Combiner 14 is usually placed in front of the driver of motor vehicle 12, but in alternative embodiments may be placed at various locations in motor vehicle 12, such as behind the driver in his or her line of vision out of the rear window through a rear view mirror. The images displayed by heads-up display systems can vary. For example, in an automobile, the heads-up display my display the speed of a vehicle, the revolution frequency of the engine, the time, turn signals, and other various alarm devices. The operation of projector 18a and combiner 14 and the incorporation of a heads-up display into motor vehicle 12 are well known within the art and require no further explanation. In an alternative embodiment, projector 18a is used to project an image to a reflecting device other than combiner 14, such as windshield 15. In other alternative embodiments, projector 18a is one of a wide variety of projectors that are used for various purposes and that are well known by those skilled in the art.

As shown in FIG. 1, in one embodiment, projector 18a receives a signal from signal generating source 49 via wiring 51 connecting the two, which may be factory installed in motor vehicle 12 or which may have to be installed along with projector 18a. In an alternative embodiment, the signal may be transmitted from signal generating source 49 and received by projector 18a via any wireless communication. One embodiment of wireless communication utilizes infrared light 53 to transmit the signal from signal generating source 49 to projector 18a. The use of infrared light 53 to transmit the signal is well known within the art and requires no further discussion. Other wireless communication systems are well known within the art and may also be used, including radio frequency (RF) signals 53a. The use of wireless communication between signal generating source 49 and projector 18a eliminates the need to install wiring between signal generating source 49 and projector 18a, and as a result facilitates installation of projector mounting system 10. Use of wireless communication also allows signal generating source 49 to transmit signals to projector 18a from various locations both inside and outside of motor vehicle 12.

Referring to FIG. 3, illumination device 20 is the final component in projector mounting system 10. In a preferred embodiment, illumination device 20 is an interior light, generally referred to as a dome light 20a, that is attached to mounting housing 16 via illumination device mount 32 (shown in FIG. 2) and includes a lens 50 and a bulb 52. Lens 50 is a plastic cover that fits over bulb 52 and that serves to protect it from damage. Bulb 52 produces light from electricity and is well known in the art. Similarly, dome lights have been used for many years in vehicles as a way to illuminate the vehicle's interior and are also well known in the art. In a first scenario, projector mounting system 10 is installed or incorporated into motor vehicle 12 as an after market component. In this scenario, motor vehicle 12 may include a dome light 20a that is attached to ceiling 22. When projector mounting system 10 is installed, the pre-existing dome light 20a is removed from ceiling 22 and attached to mounting housing 16. As mentioned above, a preferred embodiment of mounting housing 16 includes a ceiling mount 30 that utilizes the same means of attaching mounting housing 16 to ceiling 22 that was used to attach dome light 20a to ceiling 22 originally. A preferred embodiment of mounting housing 16 also includes an illumination device mount 32 to which dome light 20a is attached using the same means of attachment that originally was used to attach dome light 20a to ceiling 22. In a second scenario, projector mounting system 10 is incorporated into motor vehicle 12 as original equipment. In this scenario, utilizing pre-existing attachment means and pre-existing dome light 20a is of no concern. Thus, there is a greater amount of flexibility in the second scenario with regard to the attachment means that are used and the specific dome light that is used.

In an alternative embodiment, illumination device 20 is incorporated into mounting housing 16. In this embodiment, an illumination device built into or attached to mounting housing 16 is used rather than pre-existing dome light 20a. This embodiment may be desirable when there is no pre-existing dome light on ceiling 22 of motor vehicle 12, or when a different dome light 20a is desired.

Figure 4:
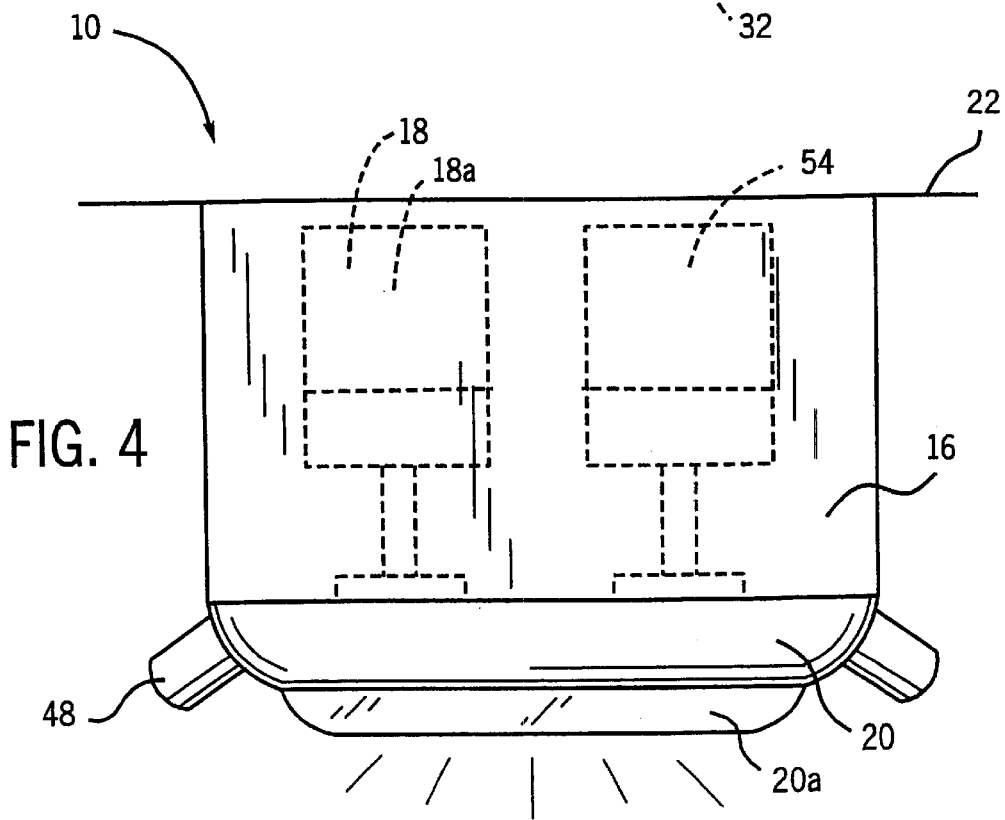
FIG. 4 is a rear elevational view of the projector mounting system supporting two different illumination devices.

Referring to FIGS. 3 and 4, in alternative embodiments of projector mounting system 10, dome light 20a may include map lights 48. Map lights, which are generally smaller than dome lights, are directed to certain areas and are meant to illuminate only a relatively small portion of a vehicle interior. The direction and area of illumination of most map lights can be adjusted by an occupant of the vehicle.

Referring still to FIG. 4, in yet another alternative embodiment, projector mounting system 10 includes a video camera 54 that is mounted adjacent to light projecting device 18 on mounting housing 16. Video camera 54 may be mounted to mounting housing 16 in the same way that light projecting device 18 is mounted to mounting housing 16, or in alternative embodiments, may be mounted to mounting housing 16 by various methods well known in the art.

As shown in FIG. 1, in one embodiment, video camera 54 transmits a signal to a signal receiving device 49a via wiring 51 connecting the two, which may be factory installed in motor vehicle 12 or which may have to be installed along with video camera 54. In an alternative embodiment, the signal may be transmitted from video camera 54 and received by signal receiving device 49a via any wireless communication. One embodiment of wireless communication utilizes infrared light 53 to transmit the signal from video camera 54 to signal receiving device 49a. The use of infrared light 53 to transmit the signal is well known within the art and requires no further discussion. Other wireless communication systems are well known within the art and may also be used, including radio frequency (RF) signals 53a. The use of wireless communication between signal receiving device 49a and video camera 54 eliminates the need to install wiring between signal receiving device 49a and video camera 54, and as a result facilitates installation of projector mounting system 10. Use of wireless communication also allows signal receiving device 49a to receive signals from video camera 54 from various locations both inside and outside of motor vehicle 12.

In other alternative embodiments of projector mounting system 10, other accessories in addition to illumination device 20 can be mounted to mounting housing 16. These accessories may include temperature control panels, direction sensing and displaying apparatuses, information displays, keyless entry signal receivers, video monitors, and other accessories that may be originally mounted to the ceilings of vehicles and that may conflict with attaching mounting housing 16 in the desired location. Rather than removing these items when projector mounting system 10 is installed, they can be incorporated into mounting housing 16 along with illumination device 20.

In a preferred embodiment of projector mounting system 10, mounting housing 16 is attached near the center of ceiling 22. However, in other alternative embodiments, mounting housing 16 may be closer to the front or back, may be closer to the left or right side, or may be a combination of both. In a preferred embodiment, projector mounting system 10 faces forward. However, in alternative embodiments, projector mounting system 10 may face side ways and even backwards.

The primary advantage of projector mounting system 10 is that it allows both an illumination device 20 and a light projecting device 18 to be mounted to ceiling 22 of motor vehicle 12. Projector mounting system 10 eliminates the need to completely remove a pre-existing illumination device that is attached to ceiling 22 in a position where it conflicts with the desired location of light projecting device 18. Projector mounting system 10 also facilitates repositioning of illumination device 20 by provided an area to which it can be mounted.

Although the present invention has been described with reference to preferred embodiments and several alternative embodiments, workers skilled in the art will recognize that changes may be made in form and detail without departing from the spirit and scope of the invention. The present invention described with reference to the preferred and alternative embodiments and set forth in the following claims is manifestly intended to be as broad as possible. For example, unless specifically noted otherwise, the claims reciting a single particular element also encompass a plurality of such particular elements.

What is claimed is:

1. A projector mounting system for use in a vehicle comprising:
   a) at least one mounting housing attachable to the ceiling of the vehicle;
   b) at least one illumination device connected to the mounting housing; and
   c) at least one projector mounted to the mounting housing, wherein the projector is mounted to be rotatable around two perpendicular axes.

2. The projector mounting system of claim 1 wherein the mounting housing is adapted to receive a pre-existing illumination device.

3. The projector mounting system of claim 2 wherein the mounting housing utilizes the attachment points adapted for the pre-existing illumination device.

4. The projector mounting system of claim 1 wherein the illumination device is a dome light.

5. The projector mounting system of claim 1 wherein the illumination device includes a map light.

6. The projector mounting system of claim 1 wherein the illumination device includes a dome light and a map light.

7. The projector mounting system of claim 1 further including a signal generating source wherein the signal generating source transmits signals to the projector.

8. The projector mounting system of claim 7 wherein the signal generating source communicates with the projector by wireless communication.

9. The projector mounting system of claim 8 wherein the wireless communication is by at least one of infrared light and radio frequencies.

10. The projector mounting system of claim 1 further comprising at least one video camera mounted to the mounting housing.

11. The projector mounting system of claim 10 further including a signal receiving device wherein the signal receiving device receives signals from the video camera.

12. The projector mounting system of claim 11 wherein the signal receiving device communicates with the video camera by wireless communication.

13. The projector mounting system of claim 12 wherein the wireless communication is by at least one of infrared light and radio frequencies.

14. A mounting housing for the attachment of a projector and an illumination device to the ceiling of a vehicle comprising:
   a) a ceiling mount configured for the attachment of the mounting housing to the ceiling of the vehicle;
   b) an illumination device mount configured for the attachment of the illumination device to the mounting housing; and
   c) a projector mount for securing the projector to the mounting housing, wherein the projector mount is configured to provide rotation around two perpendicular axes.

15. The mounting housing of claim 14 further comprising a volume for containing the projector.

16. The mounting housing of claim 14 further comprising a window through which light from the projector can pass.

17. A projector mounting system for use in a vehicle comprising:
   a) at least one mounting housing that is attachable to the ceiling of the vehicle;
   b) at least one accessory that is connected to the mounting housing; and
   c) at least one projector mounted to the mounting housing, wherein the projector is mounted to be rotated around two perpendicular axes.

* * * * *